US010668912B2

(12) United States Patent
Kirchner

(10) Patent No.: US 10,668,912 B2
(45) Date of Patent: Jun. 2, 2020

(54) POSITION DETERMINING METHOD FOR A PARKING LOCK

(71) Applicant: Siemens Aktiengesellschaft, Munich (DE)

(72) Inventor: Eckhard Kirchner, Erlangen (DE)

(73) Assignee: Valeo Siemens eAutomotive Germany GmbH, Erlangen (DE)

(*) Notice: Subject to any disclaimer, the term of this patent is extended or adjusted under 35 U.S.C. 154(b) by 438 days.

(21) Appl. No.: 15/272,952

(22) Filed: Sep. 22, 2016

(65) Prior Publication Data

US 2017/0088111 A1  Mar. 30, 2017

(30) Foreign Application Priority Data

Sep. 24, 2015 (DE) .................. 10 2015 218 411

(51) Int. Cl.
*F16D 63/00* (2006.01)
*B60T 17/22* (2006.01)
*B60T 1/00* (2006.01)
*F16H 63/34* (2006.01)
*B60T 1/06* (2006.01)
(Continued)

(52) U.S. Cl.
CPC ............. *B60T 17/22* (2013.01); *B60T 1/005* (2013.01); *B60T 1/062* (2013.01); *B60T 7/12* (2013.01); *B60T 13/746* (2013.01); *F16D 63/006* (2013.01); *F16D 66/00* (2013.01); *F16H 63/3466* (2013.01); *F16D 2066/003* (2013.01); *F16D 2066/006* (2013.01); *F16D 2125/40* (2013.01); *F16H 63/48* (2013.01); *F16H 2342/00* (2013.01)

(58) Field of Classification Search
CPC .......... F16D 2125/40; F16D 2066/003; F16D 2066/006; F16D 63/06; F16D 66/00; B60T 17/22; B60T 13/746; B60T 1/005; B60T 1/062; F16H 63/3466; F16H 63/48
See application file for complete search history.

(56) References Cited

U.S. PATENT DOCUMENTS

2007/0283735 A1  12/2007  Schweiher et al.
2015/0066324 A1   3/2015  Baehrle-Miller et al.
(Continued)

FOREIGN PATENT DOCUMENTS

DE  10 2012 205 576 A1  10/2013
DE  10 2012 206 226 A1  10/2013
EP     1 855 933 B1     7/2008

*Primary Examiner* — Stacey A Fluhart
(74) *Attorney, Agent, or Firm* — Cozen O'Connor

(57) ABSTRACT

A method for determining the position of a first actuating element of an electrical parking lock device of a motor vehicle, wherein the first actuating element is mounted on a spindle in an axially mobile manner, where the method includes a step in which the first actuating element is moved in an opening direction to a stop, the spindle is then rotated to move the first actuating element in a closing direction, the current input and the energy consumption of a driver are captured at this point, provision is then made for identifying a first reference point if the current input of the spindle drive increases or decreases by at least a first threshold value, the first reference point is assigned to the energy consumption that has been captured, where the first reference point corresponds to the first actuating element coming into contact with an actuating pawl.

16 Claims, 6 Drawing Sheets

(51) Int. Cl.
    *B60T 13/74*     (2006.01)
    *B60T 7/12*     (2006.01)
    *F16D 66/00*     (2006.01)
    *F16H 63/48*     (2006.01)
    *F16D 125/40*     (2012.01)

(56) References Cited

U.S. PATENT DOCUMENTS

| | | | |
|---|---|---|---|
| 2015/0100215 A1 | 4/2015 | Sussek | |
| 2015/0217750 A1* | 8/2015 | Sussek | B60T 17/221 701/70 |
| 2018/0148022 A1* | 5/2018 | Misumi | B60T 8/171 |
| 2018/0156635 A1* | 6/2018 | Mair | F16D 59/02 |

* cited by examiner

POSITION DETERMINING METHOD FOR A PARKING LOCK

BACKGROUND OF THE INVENTION

1. Field of the Invention

The invention relates to a method for determining an actuating position of a parking brake in a motor vehicle and to a computer program for performing said method. The invention also relates to a corresponding controller for a parking lock device and the corresponding parking brake system.

2. Description of the Related Art

EP 1 855 033 B1 discloses a transmission lock for a motor vehicle, which serves as a parking lock arrangement. The transmission lock comprises a ratchet wheel that is equipped with teeth in which a pawl engages in a blocked state. The pawl can be actuated by a locking cone that is mounted on a locking element in an axially mobile manner and is pretensioned.

DE 10 2012 205 576 A1 discloses a method for providing a clamping force that is exerted by an auxiliary brake in a motor vehicle. The auxiliary brake has an electric braking motor, by which a brake piston is actuated via a spindle and pushes against a brake disc. In order to determine the clamping force, a motor constant is determined from the voltage and current strength at the braking motor in a no-load phase. A temporal gradient of the current strength at the braking motor is captured to identify the no-load phase. A current strength below followed by a current strength above a first and a second threshold value respectively indicates the start of the no-load phase. The current strength is constant in the no-load phase itself. A subsequent positive gradient in the current strength indicates the end of the no-load phase.

DE 10 2012 206 226 A1 discloses a method for adjusting an auxiliary brake in a vehicle, where a clamping force is exerted on a brake disc via a braking motor. A voltage jump is captured when the braking motor starts up, and a corrected current strength is determined therefrom. The corrected current strength is used as a basis for calculating a motor constant by which the clamping force generated by the auxiliary brake can be determined.

The conventional methods require extensive data relating to the structure of the parking brake or auxiliary brake, and can no longer be used reliably if there is a failure in the vehicle electronics that provide the corresponding data. Moreover, degradation phenomena, such as brake disc wear or slight plastic deformations of parking lock pawl or parking lock wheel, are not sufficiently indicated, and therefore the actuating precision of the parking brake or auxiliary brake decreases during the course of vehicle operation.

SUMMARY OF THE INVENTION

In view of the foregoing, it is an object of the invention to provide a method for operating a parking lock that overcomes the disadvantages of prior art locks, which is resilient in the event of electronic failure and data loss, and which during operation is capable of adapting itself automatically to degradation phenomena in the parking lock, and is executable quickly and without inconvenience to the driver.

These and other objects and advantages are achieved in accordance with the invention by a position identifying method for a parking lock in a motor vehicle in which the method in accordance with the invention is based on determining the position of a first actuating element, which is configured to apply and release the parking lock. The first actuating element is mounted on a spindle in an axially mobile manner, and can be moved in both directions via an electrically operated driver. The first actuating element is configured to activate interlocking of the parking lock by pushing on an actuating pawl. In a first method step, the first actuating element is moved in an opening direction on the spindle until it reaches a stop. The stopping at the stop can be identified by a correspondingly marked increase in the current strength at the driver and is used in the subsequent method steps as a reference level for an energy consumption of the spindle drive motor. Once the first actuation element has reached the stop, it is no longer in mechanical contact with the actuating pawl.

In a further method step, the driver is activated such that the first actuating element is moved in a closing direction that is opposite to the opening direction. The current input and the energy consumption of the driver are captured during this movement. The current input represents a measure of the mechanical resistance that must be overcome when the first actuating element is moved. In a further method step, a first reference point is identified if the current input of the driving means changes by at least a first threshold value, i.e., increases or decreases. The first reference point comprises the energy consumption between the start of the movement in a closing direction and the change in magnitude in the current input by at least the first threshold value. The first reference point corresponds mechanically to the first actuating element coming into contact with the actuating pawl, at which point a mechanical supporting effect occurs between them. The resistance to be overcome for the movement of the first actuating element and, hence, the current input of the driver, changes accordingly. The method in accordance with the invention provides the first reference value to a controller of the parking lock device such that the energy consumption during the movement of the first actuating element in the region between the stop and the first reference point is the measure for its axial position on the spindle.

The current input and the energy consumption are measured variables that can be measured with a high degree of precision using simple means. Therefore, the position of the first actuating element on the spindle in an axial direction can be determined with a high degree of accuracy. Moreover, the method in accordance with the invention is based on measured variables which are captured by measuring devices arranged at the driver. The measuring devices can therefore be spatially separate from the first actuating element. By virtue of the method in accordance with the invention, it is unnecessary to install costly sensors in the region of the first actuating element and/or the actuating pawl. In summary, the method in accordance with the invention allows a simplified and more economical structure of the parking lock device and ensures significant space savings as a result of the spatial separation of the actuating mechanism and its position capture. As a result, integration of the parking lock device in a motor vehicle is in turn simplified. Moreover, the method in accordance with the invention still allows the position of the first actuating element to be captured accurately if neither position nor reference value are known at the start of the method. The claimed method is therefore robust and offers a high degree of protection against failures or memory resets in the control electronics of the motor vehicle.

In a preferred embodiment of the method in accordance with the invention, an additional step is performed in which a second reference point is identified. In this step, the first actuating element is moved further in the closing direction on the spindle. The identification of the second reference point occurs after the first reference point has been identified. For the purpose of identifying the second reference point, the energy consumption and the current input of the driver are again captured in this case. The presence of the second reference point is identified if the current input of the driver exceeds a second threshold value. Here, the increase in the current input is caused by a second actuating element stopping at an end position. The second actuating element is mounted on the spindle in an axially mobile manner and is also configured to push the actuating pawl in an interlock activating direction. The opening direction of the first actuating element corresponds to the closing direction of the second actuating element. The parking lock pawl also has two functional surfaces accordingly, in order to bring about a closure of the parking lock in each case when the independent actuating elements have opposite directions of movement.

The spindle guide element is arranged between the first and second actuating element on the spindle. The spindle guide element is formed with the spindle as a lead screw, roller screw or ball screw. However, essentially any form of linear actuator which exerts a controlled linear mechanical force along an axial direction is suitable. The axial movement of the spindle guide element occurs as a result of rotation of the spindle or a linear actuator, for example. In this way, the spindle guide element limits the axial movement of the first actuating element along the spindle. The data that forms the basis of the second reference point comprises the energy consumption that occurs from setting off at the stop to reaching the second reference point. The energy consumption is therefore a measure for the axial position of the first actuating element on the spindle. By performing an interpolation between the reference values and the stop, it is possible to determine any position of the first actuating element between the stop and the two reference values. The capture of the energy consumption during the actuation of the spindle drive motor can easily be performed by measuring devices that are already attached to an electric motor or its corresponding control unit. The advantages of the disclosed embodiments of the method in accordance with the invention are consolidated by the use of the second reference value.

In addition to the data for the second reference point, the actuation state of the second actuating element at the beginning of the method is preferably also identified. A released state of the second actuating element at the beginning of the method is identified if the current input between the first and second reference point exhibits, at least to some extent, a positive temporal gradient that corresponds essentially (substantially) to an elastic deformation. As the spindle guide element moves to the second reference point, the second actuating element is pushed out of the released position, where an increasing mechanical resistance must be overcome. Here, the mechanical resistance remains lower than the stopping force that acts on the second actuating element as a result of stopping at the end position.

By contrast, an arrested state of the second actuating element at the beginning of the method is identified if the current input between the first and second reference points (essentially immediately before reaching the stop at the end position) lies in the region of a no-load value of the driving means.

The possibilities of the method in accordance with disclosed embodiments of the invention for identifying the state of the parking lock system, irrespective of previously known information about it, are further extended thereby. The method in accordance with disclosed embodiments of the invention accesses data that has already been measured in this case, and is easy to implement. In particular, the claimed embodiments of the method can be implemented via a software update in the case of an electrical parking lock device.

In addition to the first reference point, the claimed method preferably also identifies the presence of a gap position of the parking brake wheel and the actuating pawl. A gap position is present if, as a pivoting movement of the actuating pawl occurs, the pawl tooth and a space between teeth of the parking brake wheel are facing each other. When the actuating pawl is actuated, these engage in a blocking manner. When the actuating pawl and the parking brake wheel engage, the path of the first actuating element in the closing direction is essentially/substantially free. As a result of the return force of a pawl spring, at least one region of the actuating pawl is pushed laterally against the first actuating element.

The gap position is preferably identified if the current input of the driver remains above the no-load value of the driver essentially/substantially immediately after the first reference point is reached. This corresponds mechanically to a further axial movement of the first actuating element in its closing direction. Here, the first actuating element is in contact with the actuating pawl such that a frictional force occurs between the first actuating element and the actuating pawl. The driver ensures a controlled axial movement of the first actuating element via the spindle guide element. The method in accordance with the invention therefore makes it possible to determine the relative angular position of the parking brake wheel in addition to the position of the first actuating element. The method in accordance with the invention therefore returns detailed information about the mechanical state of the parking lock device, where the information can be made available to a driving assistance system.

Alternatively, the method in accordance with the invention identifies an opposition position of the parking brake wheel and the actuating pawl. An opposition position is present when the pawl tooth and one of the teeth of the parking brake wheel are facing each other, such that any engagement of the actuating pawl and the parking brake wheel is prevented. The opposition position is identified if the current input of the driver decreases to the no-load value of the driver essentially/substantially immediately after the first reference point is reached. In an opposition position, the first actuating element is supported by the actuating pawl in a stable manner, such that the first actuating element is prevented from sliding past the actuating pawl. The spindle guide element is consequently relieved of the first actuating element in an axial direction. The transport of the spindle guide element, now under essentially no mechanical load, in the closing direction of the first actuating element is effected using the no-load power of the driving means. Here, the no-load power is characterized by the no-load value of the current input of the drivers. In summary, the method in accordance with the invention makes it possible to determine the mechanical state of the parking lock device in a detailed manner and make the corresponding information available to a vehicle control system.

The method in accordance with the invention can also have a step in which the actuating pawl is interlocked as a preparatory measure by a second actuating element, which is also mounted on the spindle in an axially mobile manner.

The method in accordance with the invention is then performed in an interlocked position of the parking lock device, where the parking lock pawl can be situated in both the gap position and the opposition position. Alternatively, the second actuating element can also be re-released before the stop is reached by the first actuating element. This ensures that the actuating pawl and the parking brake wheel are situated in a gap position after a very short travel distance at most. This results in a first and second reference point being generated with maximal separation. In combination with the precise measurement of the energy consumption until the reference points are reached, a high degree of measurement accuracy for the position of the first actuating element is achieved thereby.

The method in accordance with the invention preferably has an additional step in which provision is made for determining the state of the second actuating element. In the state determining step, the first actuating element is moved in its opening direction on the spindle until the stop is reached. During the movement in the opening direction, the current input and the energy consumption of the driver are measured in this case. The current input and the energy consumption indicate in electrical terms the mechanical resistance of the first actuating element that is to be overcome. In this case, only variations that occur and lie within the hysteresis range of the driver can be ignored. With the state determining step, it is also possible to identify the mechanical state of the parking lock device if no data about the actuating elements is available at the beginning of the method in accordance with the invention. The state of the parking lock device can be accurately and easily derived from the data that is captured when determining the first and/or second reference point and the data that is determined in the state determining step. Additional sensor technology in the parking lock device is rendered unnecessary by the method in accordance with the invention.

In a preferred embodiment of the claimed method, an unretained state of the second actuating element is identified both during the identification of the first and/or second reference point and during the state determining step. In such an unretained state, the second actuating element abuts the spindle guide element before and after the state determining step and is guided first in its closing direction and then in its opening direction. The opening direction of the second actuating element corresponds to the closing direction of the first actuating element and the closing direction of the second actuating element corresponds to the opening direction of the first actuating element. The second actuating element is preferably pretensioned in an axial direction by a spring, such that the force exerted on the spindle guide element when identifying the first and/or second reference point increases in a largely continuous manner at least partially in the region between the first and second reference point, and decreases in a largely continuous manner in the state determining step. The force exerted by the second actuating element corresponds to the current input, and therefore the current input when identifying the first and/or second reference point corresponds essentially/substantially to the current input when determining the state. A correspondence here is understood to mean having equal magnitude while discounting variations due to hysteresis losses.

In an alternative embodiment of the method in accordance with the invention, a retained state of the second actuating element is identified during the determination of the first and/or second reference point and the state determining step. In such a retained state, the second actuating element is prevented from moving along the axial direction before and after the state determining step by an arrester. The respective current inputs when identifying the first and/or second reference point and during the state determining step correspond to each other and are therefore essentially/substantially equal. The spindle guide element comes up against the second actuating element in the region of the second reference point, such that an essentially stepped or sudden increase in the current input occurs. When the state determining step is initiated, a tightening torque between the spindle guide element and the second actuating element is released, such that the current input decreases in an essentially stepped or sudden manner. The method in accordance with the invention therefore identifies from the stepped increase or decrease of the current input that the second actuating element is in a retained state at the beginning and end of the method. In this context, a decrease or increase of the current input is understood to signify a change whose magnitude substantially exceeds the variations caused by hysteresis losses of the driver.

Alternatively, it is possible to identify the presence of an unretained state when determining the first and/or second reference point and a retained state when determining the state. In this case, the second actuating element is moved during the determination of the first and/or second reference point, and caught by the arrester. Here, the force exerted in an axial direction by the second actuating element must be overcome by the spindle actuating element. The force thus exerted forms a mechanical resistance that corresponds to a corresponding energy consumption. When the state determining step is initiated, the second actuating element remains in its arrested position, such that the spindle guide element is not subjected to any forces by the second actuating element. Consequently, the energy consumption during the state determining step is lower than the energy consumption when determining the first and/or second reference point. When comparing the energy consumptions in terms of magnitude, variations due to hysteresis losses should be ignored.

Similarly, the method in accordance with the invention can identify the presence of a retained state when determining the first and/or second reference point and an unretained state when determining the state. Here, the second actuating element is situated in its arrested position and does not move during the determination of the first and/or second reference point. When the state determining step is initiated, the force exerted in an axial direction by the second actuating element must be overcome by the spindle actuating element. The force thus exerted forms a mechanical resistance which corresponds to a corresponding energy consumption. Consequently, the energy consumption when determining the first and/or second reference point is lower than the energy consumption during the state determining step. When comparing the energy consumptions in terms of magnitude, variations due to hysteresis losses should be ignored.

In summary, the method in accordance with the invention makes it possible to identify the mechanical state of the second actuating element without additional sensors. As a result, the parking lock device has resilience against data loss in a supervisory control unit, e.g., following a memory reset. Moreover, the state of the parking lock device can be identified automatically and reliably to allow correct actuation following exposure to interference. In particular, it is possible to dispense with expensive adjustment of the controller of the driver in the event of a repair to the parking lock device. The resilience and economic efficiency of the parking lock device are further increased thereby. The method in accordance with the invention is suitable for monitoring its own proper service condition, where the monitoring can be integrated into the standard use of the parking lock device. Such self-monitoring avoids inconveniences to the driver and allows the parking lock device to be actuated in a constantly precise manner.

Using the method in accordance with the invention, it is also possible to capture a first rotor position of the spindle when the stop is reached. The first rotor position comprises an angular value between 0° and 360°, which is measured by the rotor position sensor of the drive motor, and does not state how many complete rotations have already been made. Once captured, the first rotor position is stored. This is followed by the state determining step, in which the first actuating element is again moved to the stop, where the change in the rotor position is determined via integration. A second rotor position is then captured, which like the first rotor position comprises an angular value between 0° and 360° and does not state how many complete rotations have already been made. A warning is then output if the difference between the first and second rotor position exceeds a tolerance value. Here, the tolerance value can correspond essentially to a play of the spindle and the spindle guide element, where the play allows the axial movement on the spindle. One important aspect of the invention is the fact that any drift of the ends of travel due to wear does not occur suddenly but rather is incremental, and that it is therefore not necessary to re-store the end of travel positions at every actuation cycle of the parking lock. Recalibration of the values stored in the control device is performed as required. The warning is then likewise output as an optical, acoustic or haptic warning to the driver, a controller or a driving assistance system. The method in accordance with the invention offers a high degree of precision when determining the position of the first actuating element. A high degree of actuating precision is thereby achieved for the parking lock device.

The first and/or second actuating element are each preferably pretensioned in an axial direction along the spindle by at least one spring. As a result of this pretensioning, the first or second actuating element is pushed in its respective closing direction. The first and second actuating element are most preferably installed so as to form a reciprocally opposing arrangement, such that the opening direction of the first actuating element corresponds to the closing direction of the second actuating element. The at least one spring is preferably formed as a helical spring, a disc spring, or a combination of both. Springs can easily be manufactured in practically any spring strength, and are both reliable and economical. Pretensioning by at least one spring allows an axial force to be exerted constantly on the first and/or second actuating element.

Furthermore, using the method in accordance with the invention, it is preferably possible to move the first and/or second actuating element via a largely constant rotational speed of the driver. A constant rotational speed reduces the number of changeable variables in the claimed method and results in further simplification. In particular, the current consumption and the energy consumption between the stop, the first reference point and optionally the second reference point at a constant rotational speed are an immediate measure for the mechanical variables of the first actuating element. Such immediately meaningful variables allow rapid analysis and make it possible to output reliably valid warnings. Moreover, a constant rotational speed results in a largely constant frictional force between the first actuating element and the actuating pawl, thereby simplifying the data analysis and hence the identification of the first and/or second reference point. As a result of the method in accordance with the invention, the efficiency of the electrical parking lock device is increased for the driver.

It is also the object of the invention to provide a program, which is designed to be stored and executed in a memory of a controller of the driver, where the controller includes a computing unit or processor. The controller is connected to the driver of the electrical parking lock device. The program is suitable for executing at least one of the methods described above, and thereby determine the position of the first actuating element of the parking lock device.

It is a further object of the invention to provide the controller. The controller in accordance with the invention is configured to control the driver of the electrical parking lock device, and comprises a computing unit or processor and a memory. The memory and the computing unit or processor are configure to store and execute the program described above.

It is yet a further the invention to provide a parking lock device having a first actuating element that is mounted in an axially mobile manner on a spindle along which it can be moved by a driver. The driver can be connected to and controlled by the controller in accordance with the invention which is equipped with a program that is suitable for implementing at least one of the above-described methods.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in further detail below with reference to an exemplary embodiment and figures, in which.

DETAILED DESCRIPTION OF THE EXEMPLARY EMBODIMENTS

Figure 1:
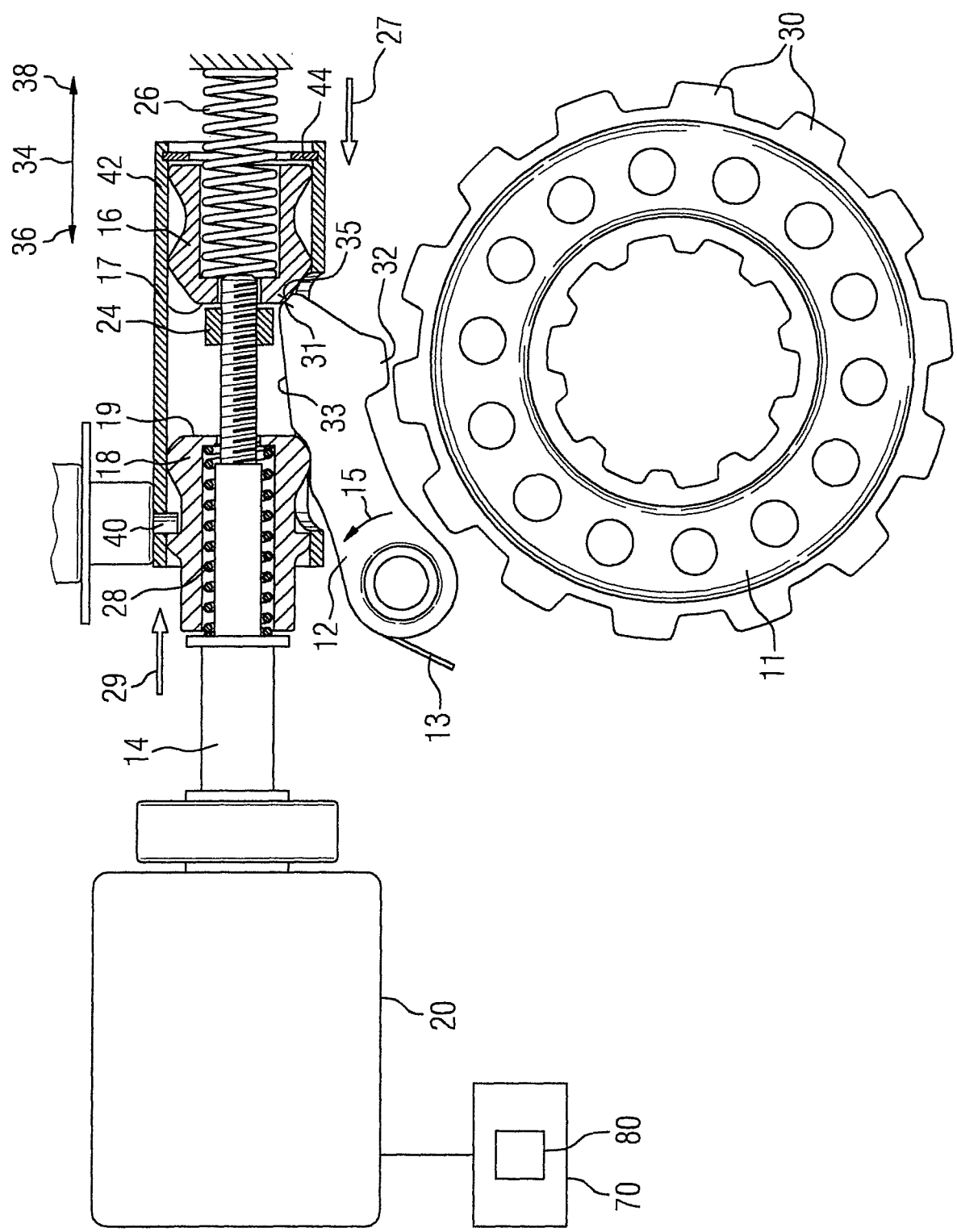
FIG. 1 shows a structure of a parking lock device in which the method in accordance with the invention can be performed.

FIG. 1 schematically illustrates the structure of an electrical parking lock device 10 in which the position of the first actuating element 16 can be determined via the method 100 in accordance with the invention. The parking lock device 10 comprises a driver 20, this taking the form of a spindle drive motor 20 that is controlled via a control unit 70 by the program 80, which implements at least one embodiment of the method in accordance with the invention 100. The driver 20 causes a spindle 14 to rotate in either a clockwise or counterclockwise direction. The spindle 14 is equipped with a thread, by which a spindle guide element 24 is moved in a controlled manner along an axial direction 34. Depending on the direction of rotation of the spindle 14, the spindle guide element is moved in the closing direction 36 or the opening direction 38 of the first actuating element 16. The first actuating element 16 is essentially configured as a cone or truncated cone, wherein the end face 17 is supported by the spindle guide element 14 and points in the closing direction 38 of the first actuating element 16. The actuation path of the first actuating element 16 is limited in a closing direction 38 by a stop 44, to which the first actuating element 16 is brought in a method step. The first actuating element 16 is pretensioned by a first spring 26, such that the associated pretension force 27 pushes the first actuating element 16 in its closing direction 36.

A second actuating element 18 is also arranged on the spindle 14, and can likewise move along the axial direction 34 of the spindle 14. The second actuating element 18 is subjected to a pretension force 29 from a second spring 28. According to FIG. 1, the second actuating element 18 is held in its position by an axially displaceable straight pin 40. The second actuating element 18 is likewise essentially configured as a cone or truncated cone, its end face 19 facing the end face 17 of the first actuating element 16. Both the first and the second actuating element 16, 18 are contained in an essentially cylindrical sleeve 42 that ensures a linear movement in an axial direction 34.

The parking lock device 10 in FIG. 1 further comprises an actuating pawl 12, which is pretensioned in an interlock deactivating direction 15 by a pawl spring 13. A pawl tooth 32 that is formed at the end of the actuating pawl 12 is configured to engage in the teeth 30 of an opposing parking brake wheel 11. An actuating section 33 is formed on that side of the actuating pawl 11 that faces away from the pawl tooth 32, and comes into contact with the first and/or second actuating element 16, 18 when the parking lock device 10 is actuated. The actuating section 33 includes a contact region 31 that is configured by virtue of its orientation to support a contact edge 35 of the first actuating element 16.

Figure 2:
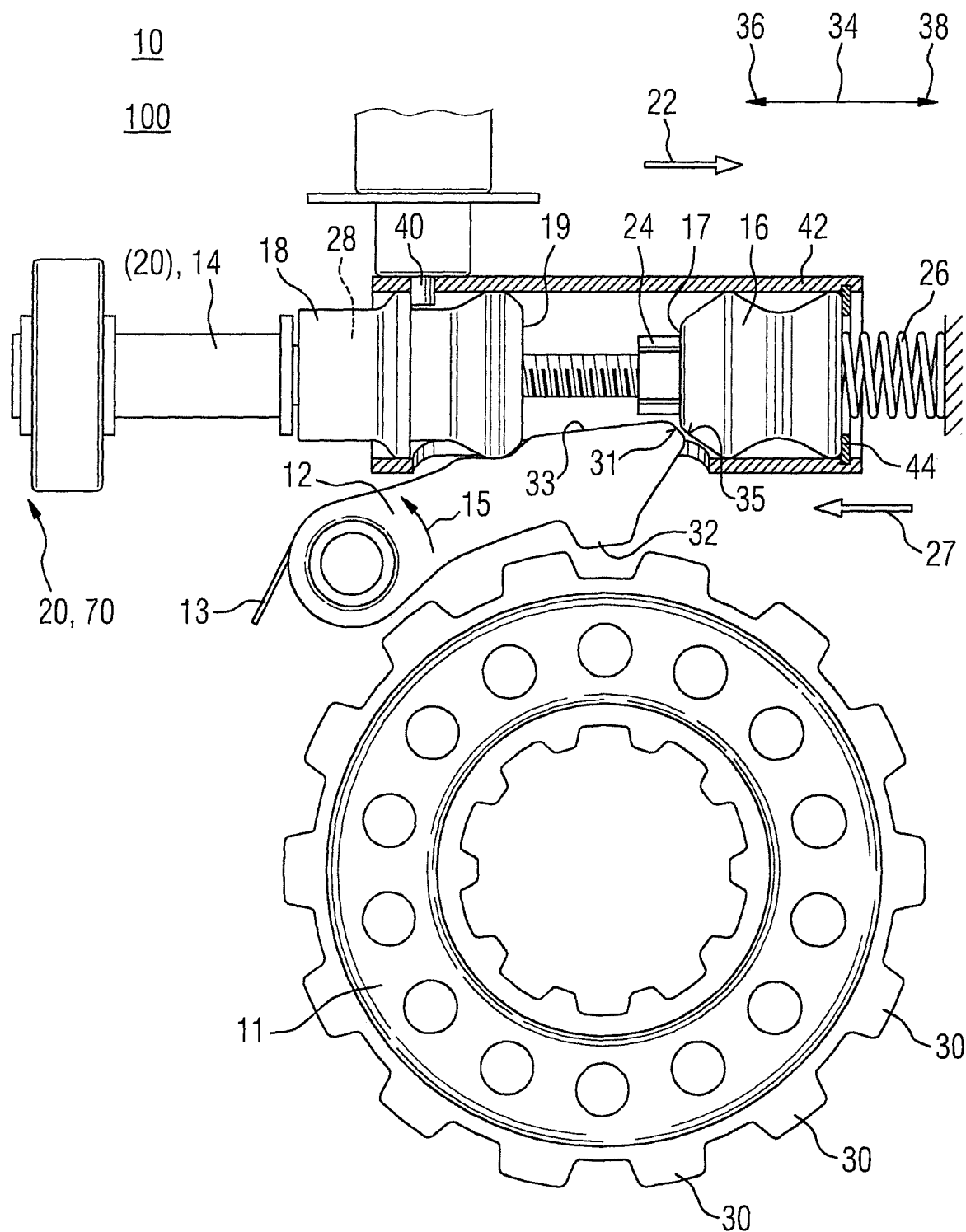
FIG. 2 shows a start position of the parking lock device in a first embodiment of the method in accordance with the invention.

FIG. 2 shows a section of the parking lock device 10 as per FIG. 1 in a start position in the method in accordance with the invention 100. The reference signs in FIG. 2 consequently designate the same features as in FIG. 1. In the start position, the spindle guide element 24 is situated in a position at which the first actuating element 16 pushes against the stop 44. In order to achieve this, the spindle guide element 24 exerts a pressure force 22 on the end face 17 of the first actuating element 16. In this case, the spring force 27 exerted by the first spring 26 reaches a maximum. In the start position shown in FIG. 2, the arrival at the stop 44 is identified by the controller 70 of the driver 20 (neither of which is illustrated in greater detail) by the presence of a marked increase in the current input of the driver 20. The start position shown in FIG. 2 describes the point in the method at which the first actuating element 16 assumes a zero position on the spindle 14.

With reference to FIG. 2, the actuating pawl 12 with the pawl tooth 32, as pretensioned in the interlock deactivating direction 15 by the pawl spring 13, is situated in a non-interlocked position. The opposing parking brake wheel ills free of forces in this position, and therefore the motor vehicle can move. The pawl tooth 32 is in a gap position relative to the teeth 30 of the parking brake wheel 11. The actuating section 33 of the actuating pawl 12 rests against the second actuating element 18 in the region of the end face 19 thereof. An air gap is present in the region of the contact edge 35 between the contact region 31 of the actuating pawl 12 and the first actuating element 16. The second actuating element 18 is pretensioned by the second spring 28, but is held in an open position within the cylindrical sleeve 42 by the straight pin 40. The closing direction 36 of the first actuating element 16 corresponds to the opening direction of the second actuating element 18. Accordingly, the closing direction 38 of the first actuating element 16 corresponds to a closing direction of the second actuating element 18.

Figure 3:
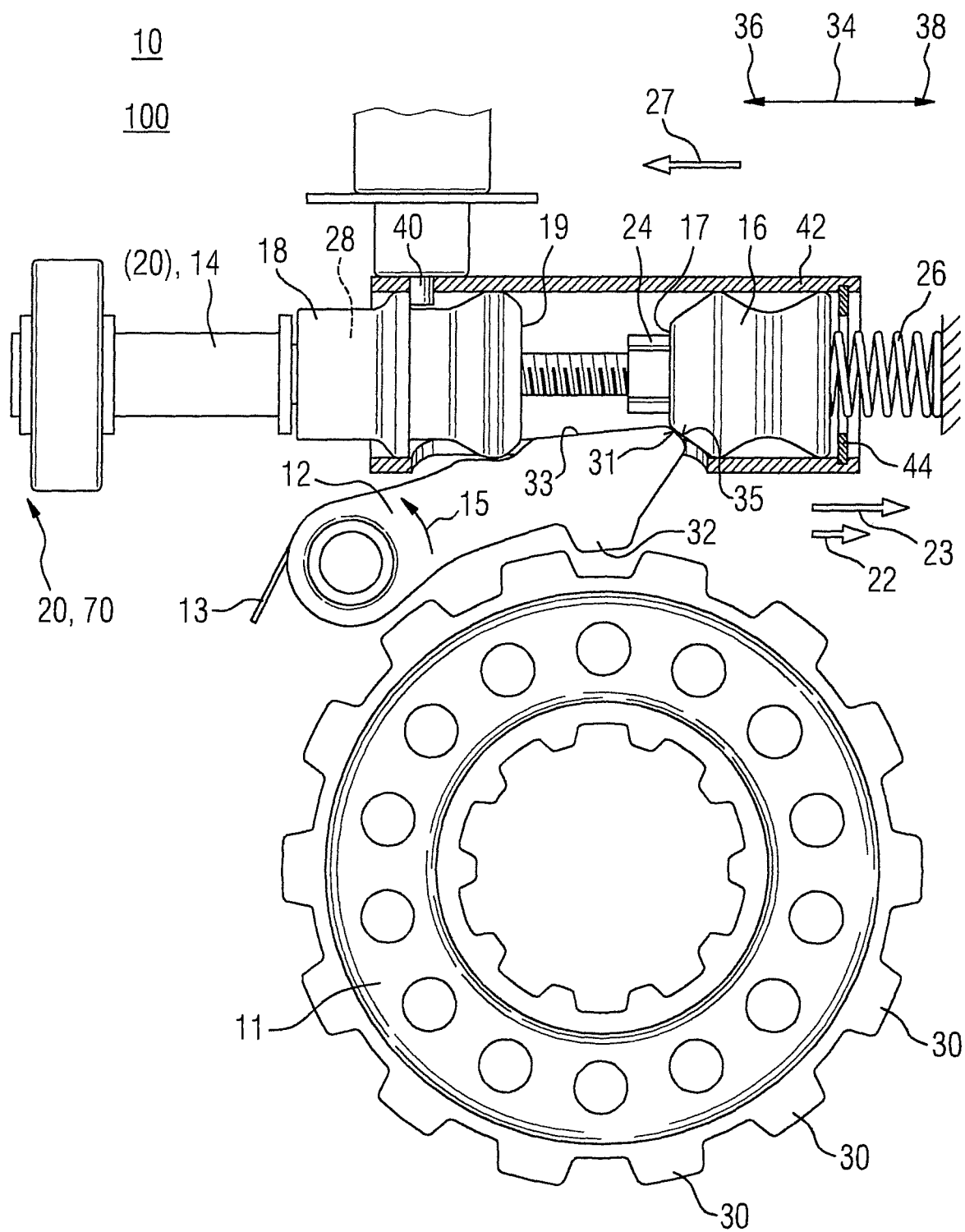
FIGS. 3 and 4 each show an intermediate stage of the parking lock device in the first embodiment of the method in accordance with the invention.

FIG. 3 shows an intermediate stage of the method in accordance with the invention 100, where the stage follows the start position in FIG. 2. The reference signs in FIG. 3 designate the same features as in FIG. 1 and FIG. 2. In FIG. 3, the actuating pawl 12 in the parking lock device 10 continues to be pushed in an interlock deactivating direction 15 by the pawl spring 13. The spindle guide element 24 abuts the end face 17 of the first actuating element 16, which is pushed in the closing direction 26 by the first spring 26. By rotating the spindle 14, the spindle guide element 24 with its thread is moved in the closing direction 36, such that the first actuating element 16 does not abut the stop 44. As a result of the spring force 27 of the first spring 26 acting on the first actuating element 16, the region of the contact edge 35 of the first actuating element 16 is pushed against the contact region 31 of the actuating pawl 12. By virtue of the conical form of the first actuating element 16 and the obliquely aligned contact region 31, a supporting force 23 occurs when they come into contact in the opening direction 38, and acts in the opening direction 38. A frictional force 22 also occurs when the first actuating element 16 slides on the actuating pawl 12, and also acts in the opening direction 38. The interaction of the spring force 27, the supporting force 23 and the effective frictional force 22 brings about a change in the mechanical load on the spindle guide element 24. The load on the spindle guide element 24 is transferred via its thread to the spindle 14, such that the current input 64 (not shown in greater detail) changes for the spindle driver 20 as shown in FIG. 1. In the intermediate stage as per FIG. 3, provision is made for identifying the energy consumption 66 (not shown in greater detail) of the driver 20 for the movement from the stop 44 until the change in the current input 64. The energy consumption 66 until the change in the current input 64 corresponds to the first actuating element 16 coming into contact with the actuating pawl 12 and forms the first reference point 45.

Figure 4:
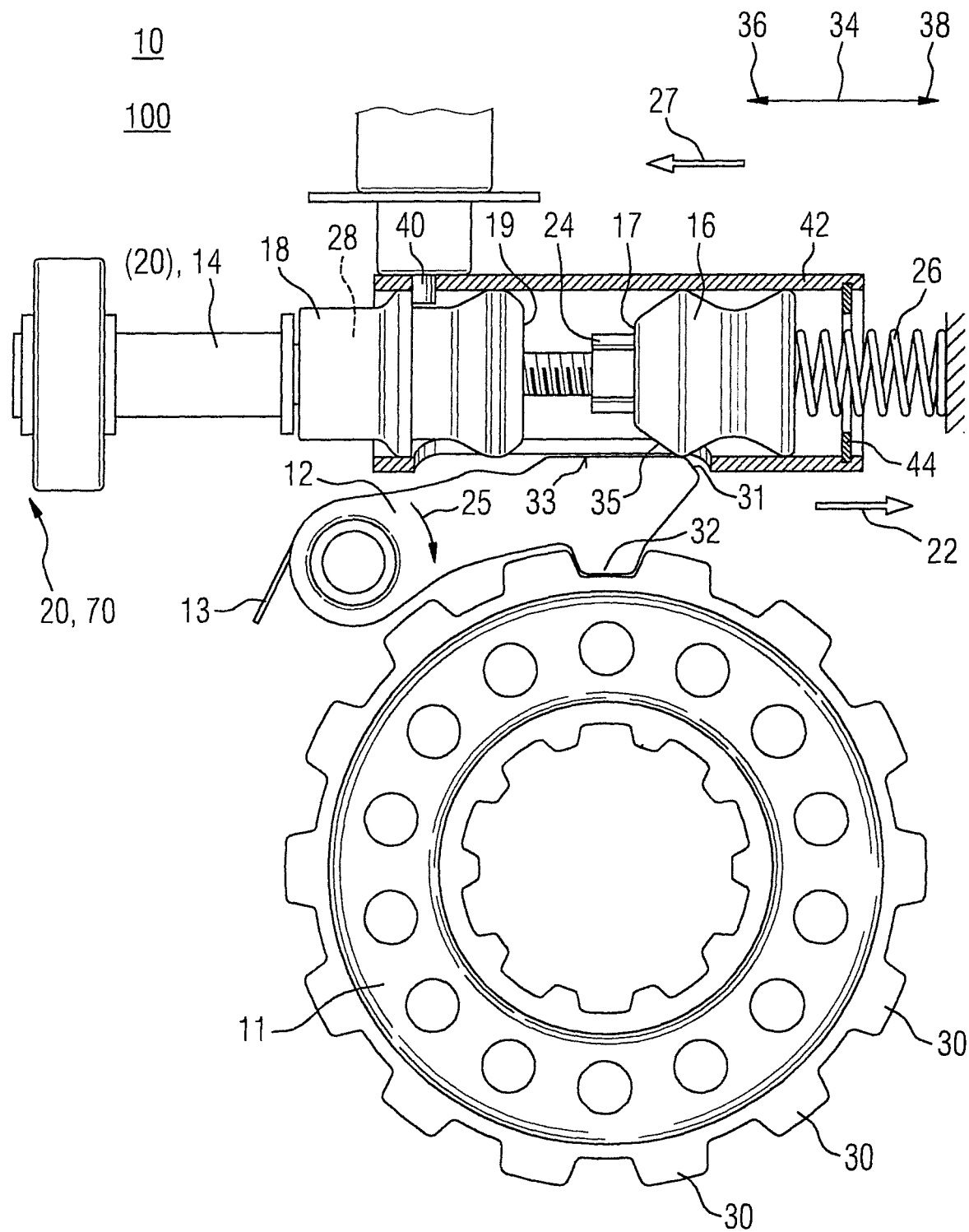

FIG. 4 shows an intermediate stage of the method in accordance with the invention 100, where the stage follows the start position in FIG. 3. The reference signs in FIG. 3 designate the same features as per FIG. 1 to FIG. 3. In the intermediate stage shown in FIG. 4, the first actuating element 16 is moved further in the closing direction 34. Here, the spring force 27 of the first spring 26 pushes the first actuating element in a closing direction 36. The first actuating element 16 is supported at its end face 17 by the spindle guide element 24, which is guided via its thread on the spindle 14. The contact edge 35 of the first actuating element 16, this having the shape of a cone or a truncated cone, comes into contact with the actuating section 33. As a result of the frictional force 22 caused by the contact between the contact edge 35 and the actuating section 33, the current input 64 (not shown in greater detail) of the driver 20 is essentially constant. During the intermediate stage as per FIG. 4, the current input 64 and the energy consumption 66 (not illustrated in greater detail) of the driver 20 are captured. As the contact edge 35 slides along the actuating section 33 of the actuating pawl 12, the actuating pawl 12 is pushed in an interlock activating direction 25, such that the pawl tooth 32 engages in the teeth 30 of the parking brake wheel 11. Here, the movement of the spindle guide element 24 is effected at an essentially/substantially constant rotational speed.

Figure 5:
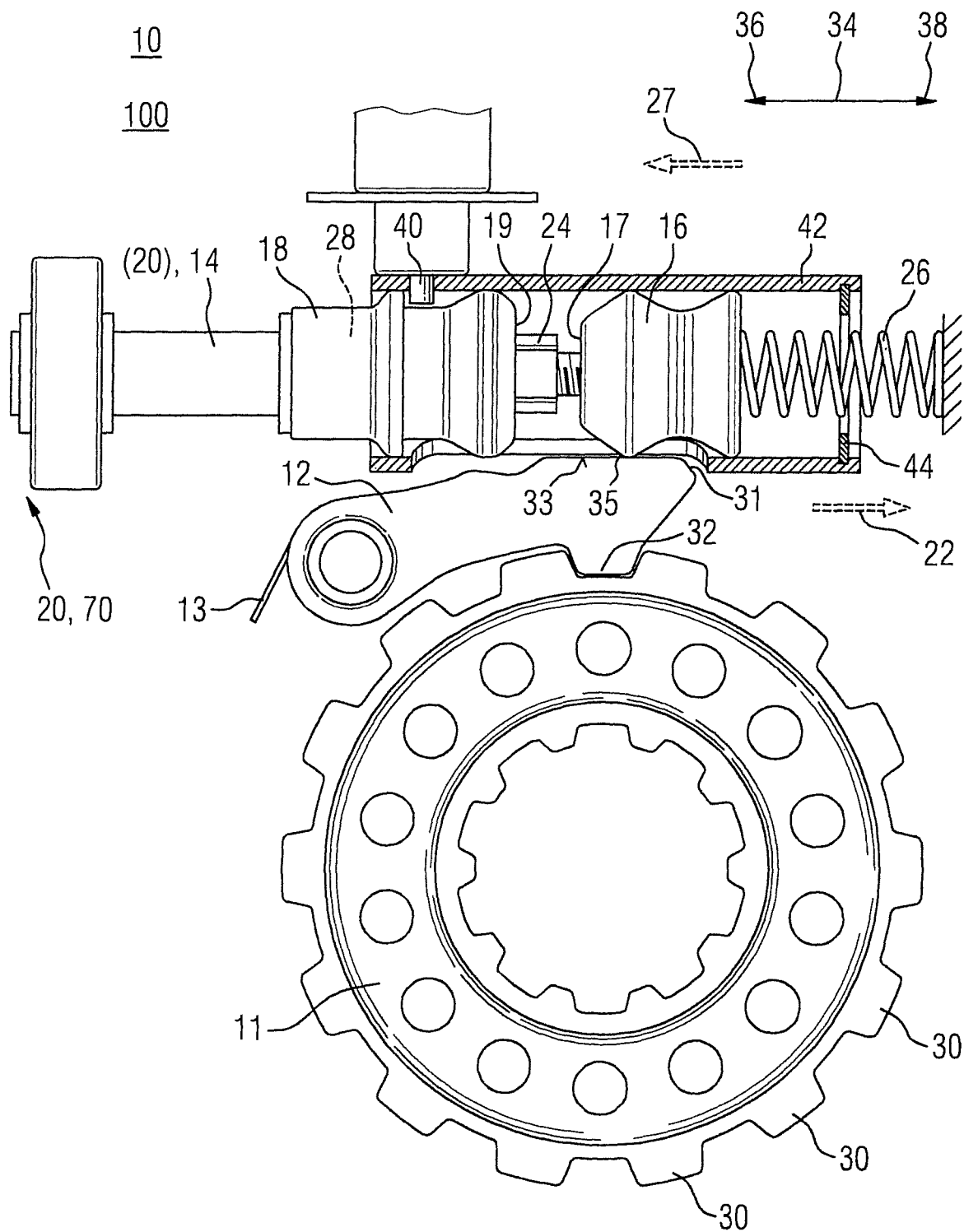
FIG. 5 shows an end position of the parking lock device in the first embodiment of the method in accordance with the invention.

FIG. 5 shows an intermediate stage of the method in accordance with the invention 100, where the stage follows the start position in FIG. 4. The reference signs in FIG. 5 designate the same features as per FIG. 1 to FIG. 4. In FIG. 5, the pawl tooth 32 of the actuating pawl 12 engages in the teeth 30 of the parking brake wheel 11, thereby causing the associated motor vehicle to stop. The actuating pawl 12 is held in place by the first actuating element 16 which, in the region of its contact edge 35, is in contact with the actuating section 33 of the actuating pawl 12. The first spring 26 is essentially without tension and exerts a minimal spring force 27 in the closing direction 36. It is countered by a frictional force 22 from the contact with the actuating pawl 12, this being caused by static friction. The minimal remainder of the spring force 27 of the first spring 26 and the frictional force 22 are indicated in FIG. 5 by broken-line arrows. The spindle guide element 24 is moreover in contact with the end face 19 of the second actuating element 18. In comparison with the intermediate stage shown in FIG. 4, the contact of the spindle guide element 24 with the first actuating element 16 is released. Between being released from the end face 17 of the first actuating element 16 and arriving at the end face 19 of the second actuating element 18, the spindle guide element 24 is only under minimal mechanical load. In this case, current input 64 (not shown in greater detail) of the driver 20 reaches a no-load value 67. The second actuating element 18 in FIG. 5 is retained in its end position by the arresting means 40. When the spindle guide element 24 arrives at the second actuating element 18, an essentially sudden increase (not illustrated in greater detail) occurs in the current input 64 of the driving means 20. As a result, the second reference value 46, which is not shown in FIG. 5, is captured. The second reference value 46 assigns the location of the second actuating element 18 in its arrested end position to the energy consumption 66 from the start of the axial movement of the spindle guide means 24 in the closing direction 36 of the first actuating element 16. By performing an interpolation between the second reference point 46 and the stop 44 and/or the first reference point 45, the energy consumption 66 (not shown in greater detail) represents a measure for the axial position of the spindle guide element 24.

Figure 6:
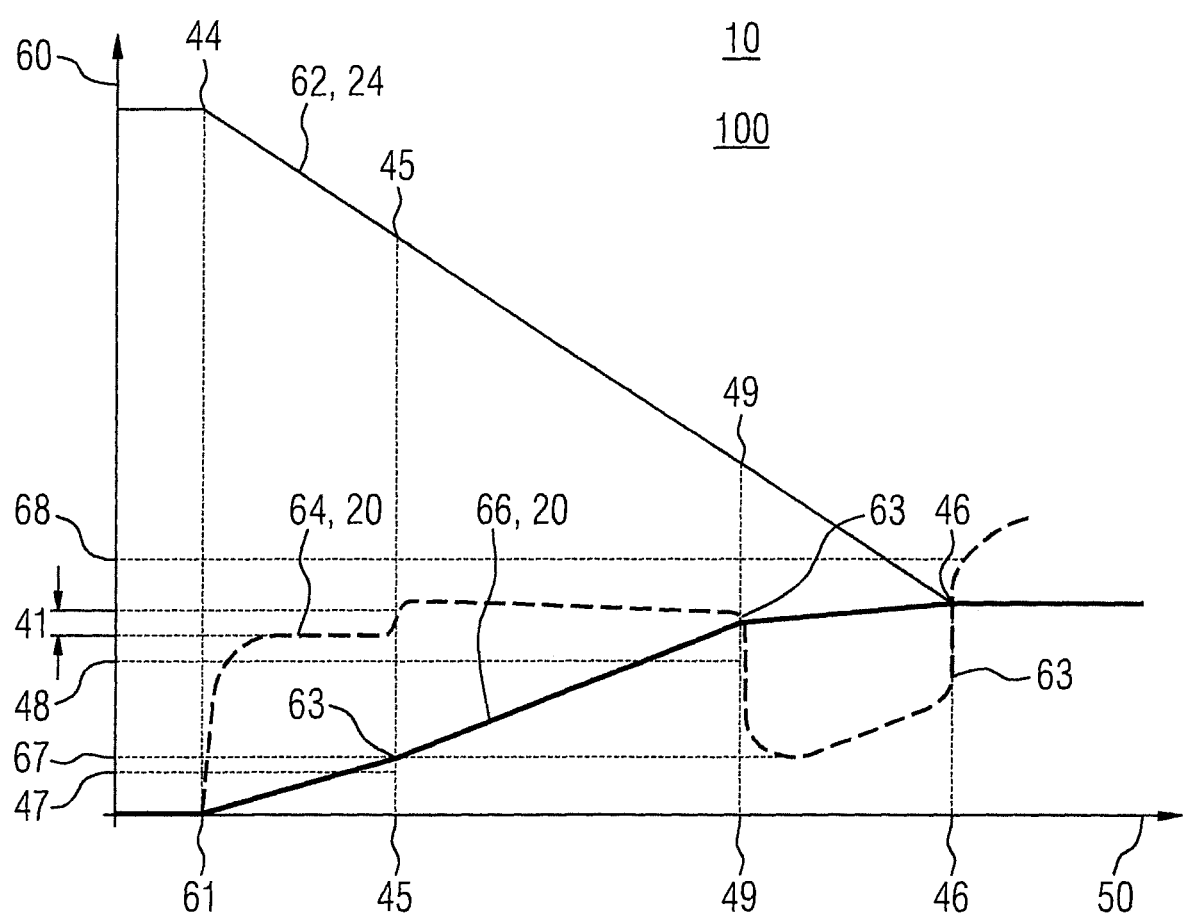
FIG. 6 shows a sequence diagram of a second embodiment of the method in accordance with the invention.

The sequence of a second embodiment of the method 100 in accordance with the invention is schematically shown in FIG. 6 in a time-value diagram. In this diagram, the horizontal axis is the time axis 50 and the vertical axis is the value axis 60, from which it is possible to "read off" the path of travel 62 parameter of the spindle guide element 24 and/or the first actuating element 16 as per FIG. 1 to FIG. 5. Here, the path of travel 62 corresponds to a position along the axial direction 34 as per FIG. 1 to FIG. 5. Likewise, the current input 64 and the energy consumption 66 of the associated driver 20 (not shown in greater detail) and corresponding limit values 47, 48 and no-load values 67 can be read off from the value axis 60. At a start time point 61, the first actuating element 16 abuts the stop 44. At the start time point 61, no movement occurs and the current input 64 and energy consumption 66 are set to the value zero when they are captured. Following the start time point 61, the current input 64 of the driver 20 increases and reaches a largely constant value. The corresponding energy consumption 66 increases in an essentially linear manner during this activity. In the region of the first reference point 45, the first actuating element 16 and the actuating pawl 12 come into contact, as per FIG. 2. As a result of the effective mechanical interaction between the first actuating element 16 and the actuating pawl 12, a change in the current input 64 occurs. The magnitude of the change exceeds a first threshold value 41, which serves as a measure for an acceptable variation in the current input 64. The first threshold value 41 is selectable and ensures that incorrect diagnoses of the parking lock device 10 are avoided according to the field of use. The energy consumption 66 that occurs before reaching the first reference point 45 is higher than a first limit value 47. The first limit value 47 being exceeded indicates that the first spring 26 as per FIG. 1 to FIG. 5 is intact or that there is no jamming of the first actuating element 16 at the stop 44. The change in the current input 64 effectively allows the identification of the first reference point 45. The energy consumption 66 between the start time point 61 and the first reference point 45 can be interpolated, such that the position of the spindle guide element 24 along the path of travel 62 can be identified during subsequent actuations of the parking lock device 10. As a result of the change in the current input 64 in the region of the first reference point 45, the characteristic curve of the energy consumption 63 exhibits a point of discontinuity 63, i.e., essentially a bend.

In the region between the first reference point 45 and the second reference point 46, the current input 64 is essentially constant and the energy consumption 66 increases in an essentially linear manner in the corresponding region. When the second reference point 46 is reached, the current input 64 decreases to the no-load value 6 of the driver 20. The course of the energy consumption 66 exhibits a point of discontinuity 63, i.e., essentially a bend, at the intermediate point 49 in the same way as it does at the first reference point 45. At the intermediate point 49, the spindle drive element 24 releases itself from the first actuating element 24 and moves with essentially no load towards the second actuating element 18 as shown in FIG. 4 and FIG. 5. The energy consumption 66 exceeds the second limit value 48 in the region between the first reference point 45 and the intermediate point 49. The exceeding of the second limit value 48 indicates that the first actuating element 24 is being moved in its interlock activating direction 25 while in contact with the actuating pawl 12, as illustrated in FIG. 3 and FIG. 4. Any sticking of the first actuating element 24 on the actuating pawl 12 is reliably excluded thereby. The energy consumption 66 between the first reference point 45 and the intermediate point 49 can easily be interpolated, such that the position of the spindle guide element 24 and the first actuating element 16 can be determined.

After the intermediate point 49 has been passed and until the end face 19 of the second actuating element 18 is reached, only minimal current input 64 occurs, i.e. in the region of the no-load value 67 of the driver 20 and, hence, only minimally increasing energy consumption 66. Contact with and axial movement of the second actuating element 18 is accompanied by an essentially linear increase in the current input 64 in the region before the second reference point 46. In this case, the second actuating element 18, against which the second spring 28 (not illustrated in greater detail in FIG. 6) presses, is pushed in the direction of its end position. At the second reference point 46, the second actuating element 18 reaches its end position and stops. As a result of stopping at the end position, an essentially stepped increase in the current input 64 occurs at the second reference point 46, such that the second threshold value 66 is exceeded. A point of discontinuity 63, i.e., a bend, occurs in the curve of the energy consumption 66 at the second reference point 46.

The method in accordance with the invention 100 returns an increasing energy consumption 66 between the start point 61 and the end point 49, where the first and second reference points 45, 46 correspond to mechanical processes in the parking lock device 10. By interpolating the energy consumption 66, it is therefore possible to calculate the position of the spindle drive element 24 and, provided the parking lock device 10 is functioning correctly, the position of the first actuating element 24. It is moreover possible to identify mechanical faults based on deviations from the first and/or second limit value 47, 48.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining a position of a first actuating element of an electrical parking lock device of a motor vehicle, the first actuating element being mounted on a spindle in an axially mobile manner, the method comprising:
   a) moving the first actuating element in an opening direction to a stop;
   b) rotating the spindle to move the first actuating element in a closing direction, and capturing a current input and an energy consumption of a driver; and
   c) identifying a first reference point corresponding to a position at which the first actuating element comes into contact with an actuating pawl if, after a captured current input of the driver has reached a substantially constant value following a start time, the captured current input of the driver increases by at least a first threshold value;
   wherein the first reference point is assigned to the energy consumption captured in step b).

2. The method as claimed in claim 1, further comprising:
   d) identifying a second reference point corresponding to a location at which a second actuating element is at an arrested position if the energy consumption exceeds a second threshold value after the first reference point has been reached.

3. The method as claimed in claim 2, wherein a released position of the second actuating element is identified if the current input between the first and second reference points exhibits a positive temporal gradient which substantially corresponds to an elastic deformation.

4. The method as claimed in claim 3, wherein the actuating pawl is initially interlocked by the second actuating element.

5. The method as claimed in claim 1, wherein said identifying comprises identifying a gap position of a parking brake wheel and the actuating pawl if the current input of the driver remains above a no-load value immediately after the first reference point is reached.

6. The method as claimed in claim 1, wherein said identifying comprises identifying an opposition position of a parking brake wheel and the actuating pawl if the current input decreases to a no-load value immediately after the first reference point is reached.

7. The method as claimed in claim 1, further comprising:
   moving the first actuating element in the opening direction while measuring the current input and the energy consumption of the driver to determine a state of at least one of the first and second reference points.

8. The method as claimed in claim 7, further comprising:
   identifying an unretained state of the second actuating element during said steps a) to c) and when determining the unretained state if respective current inputs when identifying the first reference point and a second reference point substantially correspond to each other and the respective current inputs when identifying the first and second reference points substantially exhibit a continuous increase or decrease during said steps a) to c) and when determining the unretained state.

9. The method as claimed in claim 7, further comprising:
   identifying a retained state of the second actuating element during said steps a) to c) and when determining the retained state if the respective current inputs when identifying the first reference point and a second reference point substantially correspond to each other and the respective current inputs when identifying the first and second reference points exhibit a substantially stepped increase or decrease in a region of the second reference point during said steps a) to c) and when determining the retained state.

10. The method as claimed in claim 7, further comprising:
    identifying an unretained state of the second actuating element during said steps a) to c) and identifying a retained state of the second actuating element when determining either state if the energy consumption is lower when determining either state than during said steps a) to c).

11. The method as claimed in claim 7, further comprising:
    identifying a retained state of the second actuating element during said steps a) to c) and identifying an unretained state of the second actuating element when determining either state if the energy consumption is higher when determining either state than during steps a) to c).

12. The method as claimed in claim 7, wherein a first rotor position of the spindle is captured during said step a), a second rotor position of the spindle is captured at an end point after said determining either state, and a warning is output if a difference between the first and second rotor position exceeds a tolerance value.

13. The method as claimed in claim 1, wherein a movement of at least one of the first and second actuating elements occurs via a substantially constant rotational speed of the driver.

14. A computer program stored on a controller connected to a driver of a parking lock device which, when executed by the controller causes controller to determine a position of a first actuating element of an electrical parking lock device of a motor vehicle, the first actuating element being mounted on a spindle in an axially mobile manner, the computer program comprising:
    a) program code for moving the first actuating element in an opening direction to a stop;

b) program code for rotating the spindle to move the first actuating element in a closing direction, and capturing a current input and an energy consumption of a driver; and c) program code for identifying a first reference point corresponding to a position at which the first actuating element comes into contact with an actuating pawl if, after a captured current input of the driver has reached a substantially constant value following a start time, the captured current input of the driver increases by at least a first threshold value;

wherein the first reference point is assigned to the energy consumption captured in step b).

15. A controller for controlling a driver of a parking lock device, comprising a memory and a computing unit for storing and executing the program as claimed in claim 14.

16. A parking lock device, comprising the first actuating element arranged on the spindle and axially moveable via the driver, wherein the driver is connectable to the controller as claimed in claim 15.

* * * * *